(No Model.)

L. GIBBS.
PLOW.

No. 259,126. Patented June 6, 1882.

Witnesses
James N. Holcomb
George F. Robinson

Inventor
Lewis Gibbs
by Bradford Howland
Attorney

UNITED STATES PATENT OFFICE.

LEWIS GIBBS, OF CANTON, OHIO, ASSIGNOR TO HIMSELF, JOHN R. BUCHER, AND HENRY A. CAVNAH.

PLOW.

SPECIFICATION forming part of Letters Patent No. 259,126, dated June 6, 1882.

Application filed March 3, 1882. (No model.)

*To all whom it may concern:*

Be it known that I, LEWIS GIBBS, of Canton, Stark county, Ohio, have invented a new and useful Improvement in Plows, of which the following is a specification.

My invention relates to handle-braces of plows; and it consists, first, in a trough-shaped upper brace the cross-section of which is U-shaped, the ends being bolted to the handles of the plow; second, in the lower braces crossing each other and being bolted together at their intersection, and each being bolted to the plow-handles.

Figure 1:
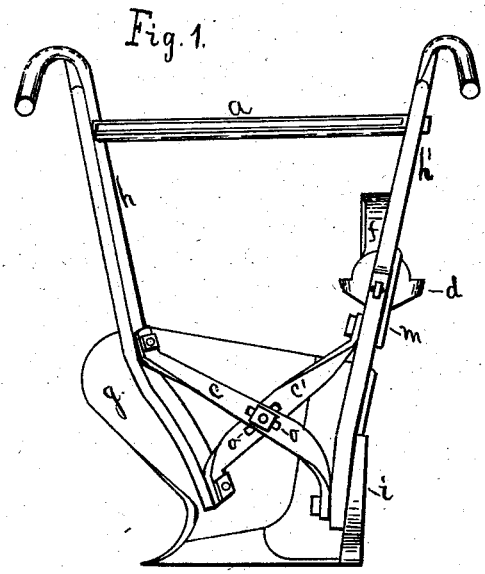
Figure 2:
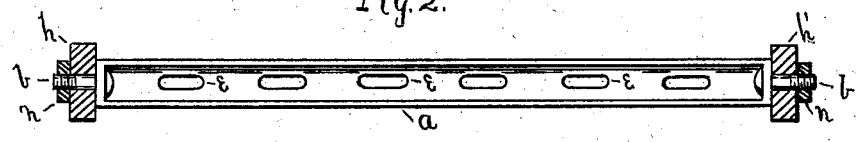
Figure 3:
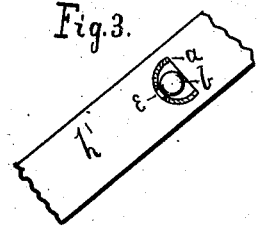

In the drawings forming a part of this specification, Figure 1 is a rear view. Fig. 2 represents the upper brace on an enlarged scale. Fig. 3 represents a cross-section of the upper brace on an enlarged scale.

The metallic upper handle-brace, $a$, is firmly fastened through its ends to the handles $h\ h'$ by small screw-bolts $b$ and nuts $n$. In form it resembles a longitudinal section of a hollow cylinder having the ends closed, except the openings for screw-bolts $b$. The open side of brace $a$ being toward the upper ends of handles $h\ h'$, only the other or convex sides are in a position to come in contact with the hands in lifting or moving the plow. The outside of the brace, instead of being convex, may be octagonal or of any suitable shape for the hand to grasp. The openings $e$ through the lower side of brace $a$ facilitate in casting the brace by tending to keep the mold in form, and also allow water and other substances that may fall into the brace to escape therefrom.

The handle-brace in common use is ordinarily a rung of wood extending through the handles, and from its large size it materially weakens the handles.

My brace $a$, while it is of sufficient size to be suitable for the hand to grasp in lifting the plow, is also of light weight by reason of its hollow form, and its closed ends, being fitted against the inner sides of the handles $h\ h'$, are firmly held in position by small bolts $b$, which pass through the handle without unduly weakening it.

The beam-piece $d$ and handle-piece $m$ connect the beam $f$ with handle $h'$ in the ordinary manner.

The lower braces, $c\ c'$, cross each other and are bolted together at their intersection. For the purpose of adjustment the braces $c\ c'$ are formed with elongated holes $o\ o$ at their intersection, where they are firmly held together by screw-bolt and nut $s$. The upper end of brace $c$ and the lower end of brace $c'$ are fastened to handle $h$ by the mold-board bolts. The upper end of brace $c'$ is fastened to handle $h'$ by the same bolt that fastens the handle-piece $m$, and the lower end of brace $c$ is attached to handle $h'$ by the same bolt that fastens the land-side $i$. These self-adjusting braces $c\ c'$, by means of the elongated holes $o\ o$, adapt themselves to plows of different widths and brace firmly in all directions.

I claim as my invention—

1. The upper handle-brace, $a$, of a trough-like shape, with the convex side downward, and formed with openings $e$, in combination with the handles $h\ h'$, screw-bolts $b$, and nuts $n$, the bolts having their heads within the brace and being fastened by the nuts at the outer sides of the handles, substantially as described.

2. The adjustable braces $c\ c'$, crossing each other, and formed with elongated holes $o$, through which they are bolted together, in combination with handles $h\ h'$, substantially as described.

LEWIS GIBBS.

Witnesses:
   D. M. STONEHILL,
   H. H. TRUMP.